United States Patent
Yoshida

(10) Patent No.: US 11,230,322 B2
(45) Date of Patent: Jan. 25, 2022

(54) VEHICLE FRONT STRUCTURE

(71) Applicant: Toyota Jidosha Kabushiki Kaisha, Toyota (JP)

(72) Inventor: Eiji Yoshida, Seto (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 113 days.

(21) Appl. No.: 16/834,080

(22) Filed: Mar. 30, 2020

(65) Prior Publication Data
US 2020/0353987 A1 Nov. 12, 2020

(30) Foreign Application Priority Data
May 8, 2019 (JP) .............................. JP2019-088600

(51) Int. Cl.
*B60J 7/00* (2006.01)
*B62D 21/15* (2006.01)
*B60R 19/02* (2006.01)

(52) U.S. Cl.
CPC .......... *B62D 21/152* (2013.01); *B60R 19/023* (2013.01)

(58) Field of Classification Search
CPC .. A01D 2101/00; A01D 85/005; A01D 90/08; A61B 5/686; A61B 2560/0219; B29C 45/1704; H01L 21/67326; H01L 21/67383; H01L 2924/0002; A47C 1/124
See application file for complete search history.

(56) References Cited

U.S. PATENT DOCUMENTS

| 9,004,216 B1* | 4/2015 | Baccouche | B60R 21/00 180/274 |
| 9,004,576 B2* | 4/2015 | Sakakibara | B62D 25/085 296/187.09 |
| 9,027,695 B2* | 5/2015 | Nakamura | B62D 21/155 180/247 |
| 9,308,940 B1* | 4/2016 | Malavalli | B62D 21/152 |
| 9,399,438 B2* | 7/2016 | Braunbeck | B60R 19/24 |
| RE47,286 E * | 3/2019 | Ohnaka | B62D 25/085 |
| 2006/0249342 A1* | 11/2006 | Canot | F16F 7/12 188/377 |
| 2009/0140546 A1* | 6/2009 | Okabe | B60R 19/18 296/187.09 |

(Continued)

FOREIGN PATENT DOCUMENTS

| JP | 2014-113894 A | 6/2014 |
| JP | 2019-093942 A | 6/2019 |

*Primary Examiner* — Kiran B Patel
(74) *Attorney, Agent, or Firm* — Dinsmore & Shohl LLP

(57) ABSTRACT

A vehicle front structure includes: a bumper reinforcement attached to a front end of a side frame in a vehicle front part; and a load transmission member attached at a position offset upward from the center of a side end portion of the bumper reinforcement. The load transmission member is joined to a front face of the side end portion such that a front end portion projects forward in the vehicle front-rear direction from the front face of the side end portion. A plate is provided at a position offset downward from the center of the side end portion in the up-down direction, the position being a position where the plate overlaps the front end portion when the plate is viewed from above in the vehicle up-down direction. The plate projects forward in the vehicle front-rear direction to the same extent as the front end portion.

2 Claims, 6 Drawing Sheets

(56) References Cited

U.S. PATENT DOCUMENTS

| | | | |
|---|---|---|---|
| 2014/0361559 A1* | 12/2014 | Sakakibara | B60R 19/34 |
| | | | 293/133 |
| 2014/0361561 A1* | 12/2014 | Kuriyama | B62D 25/082 |
| | | | 293/133 |
| 2015/0076862 A1* | 3/2015 | Abe | B62D 25/082 |
| | | | 296/187.1 |
| 2015/0142271 A1* | 5/2015 | Cuddihy | B60R 19/483 |
| | | | 701/45 |
| 2016/0101751 A1* | 4/2016 | Bou | B62D 21/152 |
| | | | 293/133 |
| 2016/0129869 A1* | 5/2016 | Le | B62D 21/15 |
| | | | 701/45 |
| 2017/0106909 A1* | 4/2017 | Daido | B60R 19/34 |
| 2017/0210316 A1* | 7/2017 | Duffe | B60R 19/04 |
| 2017/0210425 A1* | 7/2017 | Sekiguchi | B62D 21/152 |
| 2018/0194399 A1* | 7/2018 | Grattan | B62D 21/05 |
| 2018/0304930 A1* | 10/2018 | Tanabe | B62D 21/152 |
| 2018/0334121 A1* | 11/2018 | Sabu | B62D 21/152 |
| 2018/0361965 A1* | 12/2018 | Hadano | B60R 19/18 |
| 2019/0161037 A1 | 5/2019 | Yoshida et al. | |
| 2019/0176898 A1* | 6/2019 | Nishii | B62D 25/08 |
| 2019/0293460 A1* | 9/2019 | Kato | B62D 27/02 |
| 2019/0315410 A1* | 10/2019 | Shinya | B62D 25/082 |

\* cited by examiner

VEHICLE FRONT STRUCTURE

CROSS-REFERENCE TO RELATED APPLICATIONS

This application claims priority to Japanese Patent Application No. 2019-088600 filed on May 8, 2019, which is incorporated herein by reference in its entirety including the specification, drawings and abstract.

BACKGROUND

1. Technical Field

The present disclosure relates to a vehicle front structure and more particularly relates to a structure for collision load absorption.

2. Description of Related Art

A front body structure of a vehicle includes a pair of right and left side frames as side frame members, and a bumper reinforcement extending in the vehicle width direction and connected to front ends of the right and left side frames. The right and left side frames are provided in a vehicle front part and extend in the vehicle front-rear direction. The bumper reinforcement includes side end portions projecting outward in the vehicle width direction from the side frames, respectively. There has been proposed a structure provided with a load transmission member extending rearward and inward in the vehicle width direction from a side end portion (e.g., see Japanese Unexamined Patent Application Publication No. 2014-113894 (JP 2014-113894 A)). The load transmission member is configured to transmit a collision load to a side face of a side frame when a small overlap collision occurs, that is, when a collision object collides with the side end portion.

SUMMARY

Incidentally, in some cases, a load transmission member may be attached to a side end portion of a bumper reinforcement at a position offset, in the up-down direction, from the center of the side end portion in the up-down direction such that a front end portion of the load transmission member projects forward from a front face of the bumper reinforcement. In this case, the side end portion of the bumper reinforcement may torsionally deform due to a collision load input into the load transmission member, thereby resulting in that a desired load may not be transmitted to a side frame as a side frame member.

An object of the present disclosure is to efficiently transmit a collision load to a side frame member via a load transmission member, the collision load being applied to a side end portion of a bumper reinforcement.

A vehicle front structure of the present disclosure is a vehicle front structure including a pair of right and left side frame members, a bumper reinforcement, and a load transmission member. The right and left side frame members are provided in a vehicle front part and extend in the vehicle front-rear direction. The bumper reinforcement is attached to front ends of the right and left side frame members. The bumper reinforcement extends in the vehicle width direction. The bumper reinforcement has right and left side end portions projecting outward in the vehicle width direction from the side frame members, respectively. The load transmission member is attached to each of the side end portions of the bumper reinforcement at a position offset, in the up-down direction, from the center of the each of the side end portions in the up-down direction. The load transmission member extends rearward in the vehicle front-rear direction and inward in the vehicle width direction. The load transmission member is configured to abut with the each of the side frame members and transmit a collision load to the each of the side frame members at a time of a collision. The load transmission member is joined to a front face of the each of the side end portions of the bumper reinforcement such that a front end portion of the load transmission member projects forward in the vehicle front-rear direction from the front face of the each of the side end portions. The load transmission member penetrates through the each of the side end portions and extends rearward in the vehicle front-rear direction and inward in the vehicle width direction. The each of the side end portions includes a projecting portion provided at a position offset from the center of the each of the side end portions in the up-down direction to a side opposite, in the up-down direction, from an attachment position of the load transmission member. The position is a position where the projecting portion overlaps the front end portion of the load transmission member when the projecting portion is viewed from above in the vehicle up-down direction. The projecting portion projects forward in the vehicle front-rear direction from the front face of the each of the side end portions to the same extent as the front end portion of the load transmission member.

Hereby, a collision load is input into the front end portion of the load transmission member and the projecting portion at the same time. The front end portion of the load transmission member projects forward in the vehicle front-rear direction from the front face of the side end portion at the position offset, in the up-down direction, from the center of the side end portion in the up-down direction. The projecting portion is provided at the position offset from the center, in the up-down direction, of the side end portion to the side opposite, in the up-down direction, from the attachment position of the load transmission member, the position being a position where the projecting portion overlaps the front end portion when the projecting portion is viewed from above in the vehicle up-down direction. The projecting portion projects forward in the vehicle front-rear direction from the front face of the side end portion to the same extent as the front end portion of the load transmission member. This makes it possible to restrain the side end portion from torsionally deforming due to the collision load and to transmit a desired load to the side frame member.

In the vehicle front structure of the present disclosure, the projecting portion may be constituted by a plate attached to the front face of the each of the side end portions.

Hereby, with a simple and easy configuration, it is possible to restrain the side end portion from torsionally deforming and to transmit a desired load to the side frame member.

With the present disclosure, it is possible to efficiently transmit a collision load to a side frame member via a load transmission member, the collision load being applied to a side end portion of a bumper reinforcement.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
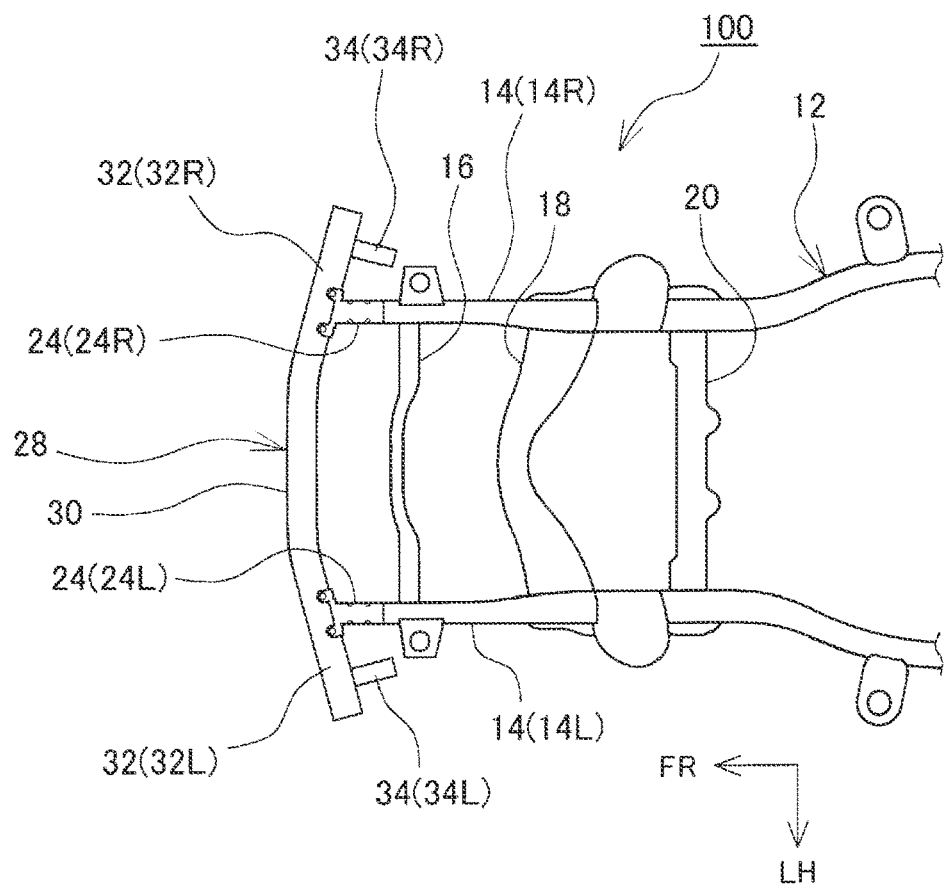
FIG. 1 is a plan view illustrating a vehicle front structure according to an embodiment.

With reference to the drawings, the following describes a vehicle front structure 100 of an embodiment. The following description deals with the vehicle front structure 100 for a vehicle using a ladder frame 12. In the drawings, the orientation of an arrow FR indicates the front side in the vehicle front-rear direction, the orientation of an arrow LH indicates the left side in the vehicle right-left direction (the vehicle width direction), and the orientation of an arrow UP indicates the upper side in the vehicle up-down direction. In the following description, terms indicative of directions and orientations such as front, rear, right, left, up, and down indicate directions and orientations with respect to the vehicle unless otherwise specified. Further, in terms of the right-left direction, a side close to the center line of the vehicle is referred to as inward in the vehicle width direction, and a side far from the center line of the vehicle is referred to as outward in the vehicle width direction.

Figure 2:
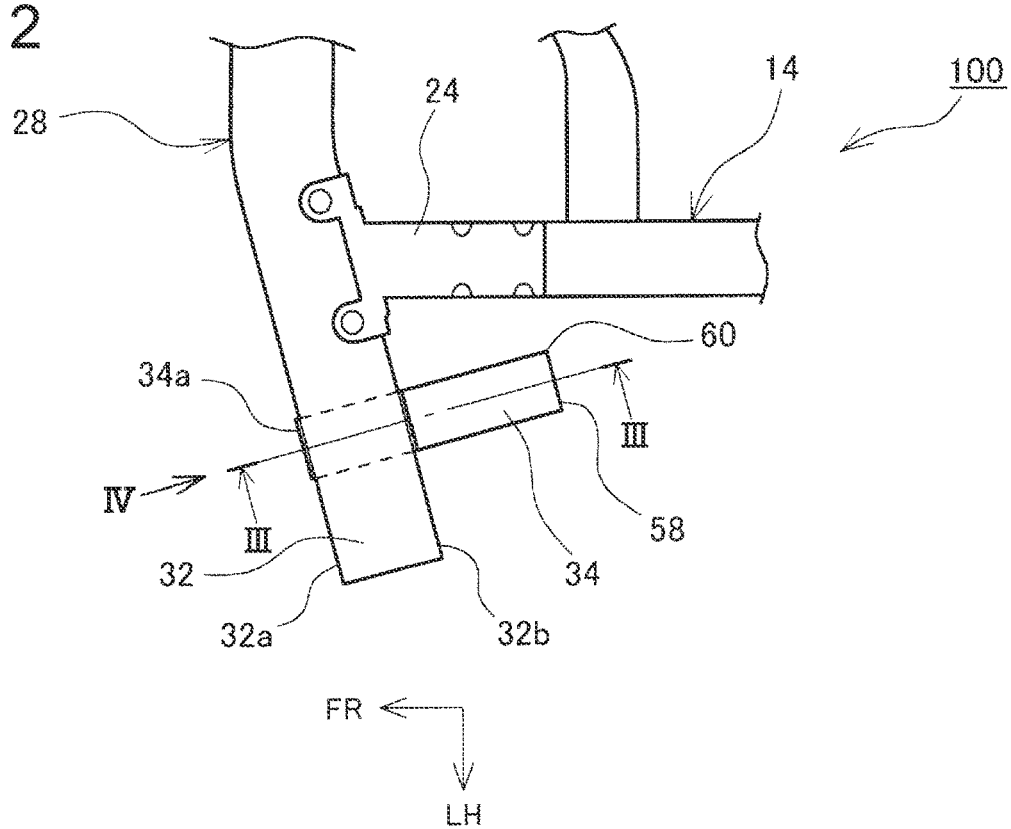
FIG. 2 is an enlarged plan view illustrating a left front part of the vehicle front structure illustrated in FIG. 1.

As illustrated in FIGS. 1, 2, the vehicle front structure 100 is a front structure for the vehicle including the ladder frame 12. The vehicle front structure 100 includes: a pair of right and left side frames 14R, 14L as side frame members provided in a vehicle front part and extending in the vehicle front-rear direction; a bumper reinforcement 28 attached to front ends of the right and left side frames 14R, 14L and extending in the vehicle width direction; and load transmission members 34R, 34L attached to right and left side end portions 32R, 32L of the bumper reinforcement 28.

The side frames 14R, 14L are made of steel and have a hollow rectangular sectional shape. Front end portions of the side frames 14R, 14L are formed as crash boxes 24R, 24L having strength lower than that of parts behind the front end portions. At the time of a front collision, the crash boxes 24R, 24L are crushed to relax impact. Further, the side frames 14R, 14L are connected to each other in the vehicle width direction via a plurality of crossmembers 16, 18, 20 extending in the vehicle width direction.

The bumper reinforcement 28 includes: a central portion 30 positioned between the right and left side frames 14R, 14L; and the side end portions 32R, 32L projecting outward in the vehicle width direction respectively from right and left end portions of the central portion 30 such that the side end portions 32R, 32L are disposed outside the side frames 14R, 14L in the vehicle width direction, respectively. The bumper reinforcement 28 has a bending or curved shape projecting forward as illustrated herein. As a result, outer ends of the side end portions 32R, 32L are inclined to be placed rearward from inner ends of the side end portions 32R, 32L, the inner ends being connected to the central portion 30.

The load transmission members 34R, 34L attached to the side end portions 32R, 32L of the bumper reinforcement 28 are attached to the side end portions 32R, 32L such that the load transmission members 34R, 34L extend rearward in the vehicle front-rear direction and inward in the vehicle width direction from the side end portions 32R, 32L. At the time of a so-called small overlap collision, a corresponding one of the load transmission members 34R, 34L transmits a collision load caused by the collision to a corresponding one of the side frames 14R, 14L. The small overlap collision is a collision in which an object collides with an outer part of the vehicle front part in the vehicle width direction, the outer part corresponding to one fourth of the vehicle front part. Details of the load transmission members 34R, 34L will be described later.

The side frames 14R, 14L, the crash boxes 24R, 24L, the side end portions 32R, 32L, and the load transmission members 34R, 34L make respective pairs on the right and left sides such that each of the pairs is provided symmetrically in the right-left direction. In the following description, when it is not necessary to distinguish them from each other in terms of right and left, the side frames 14R, 14L are just referred to as the side frame 14, the crash boxes 24R, 24L are just referred to as the crash box 24, the side end portions 32R, 32L are just referred to as the side end portion 32, and the load transmission members 34R, 34L are just referred to as the load transmission member 34.

Figure 3:
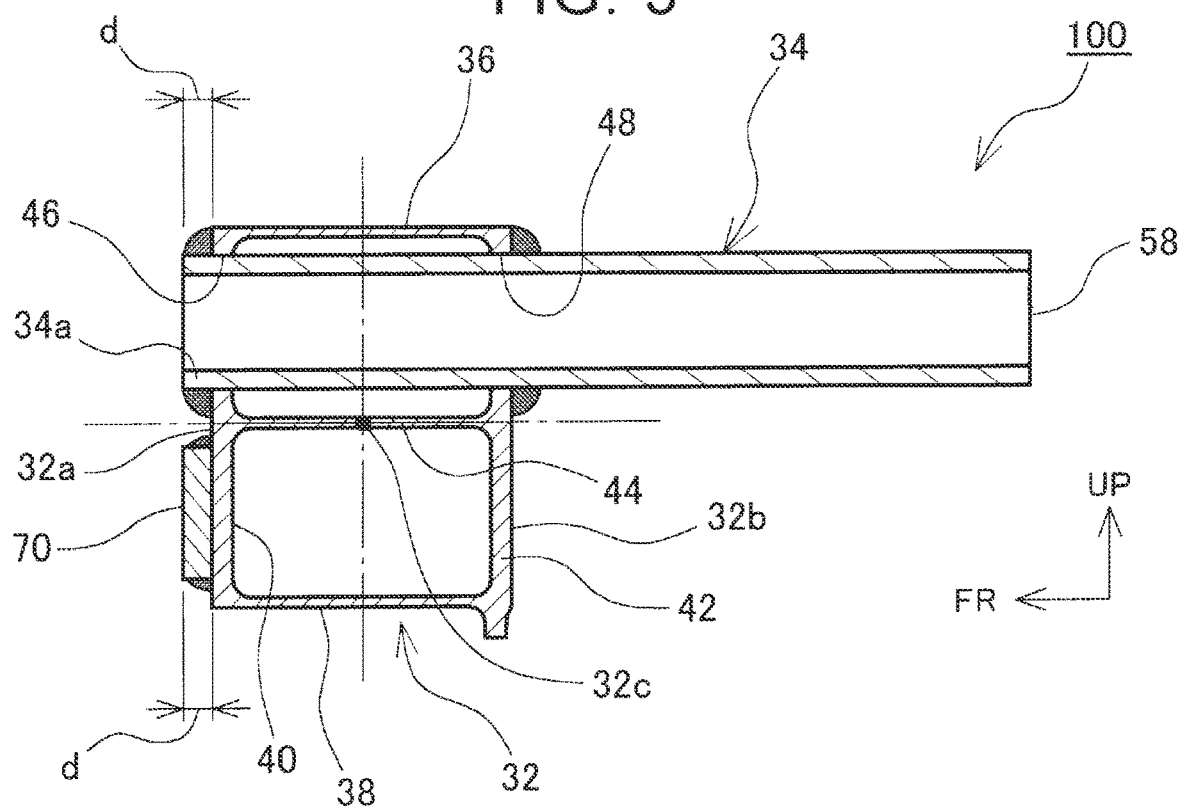
FIG. 3 is a sectional view of a bumper reinforcement and a load transmission member taken along a line in FIG. 2.
Figure 4:
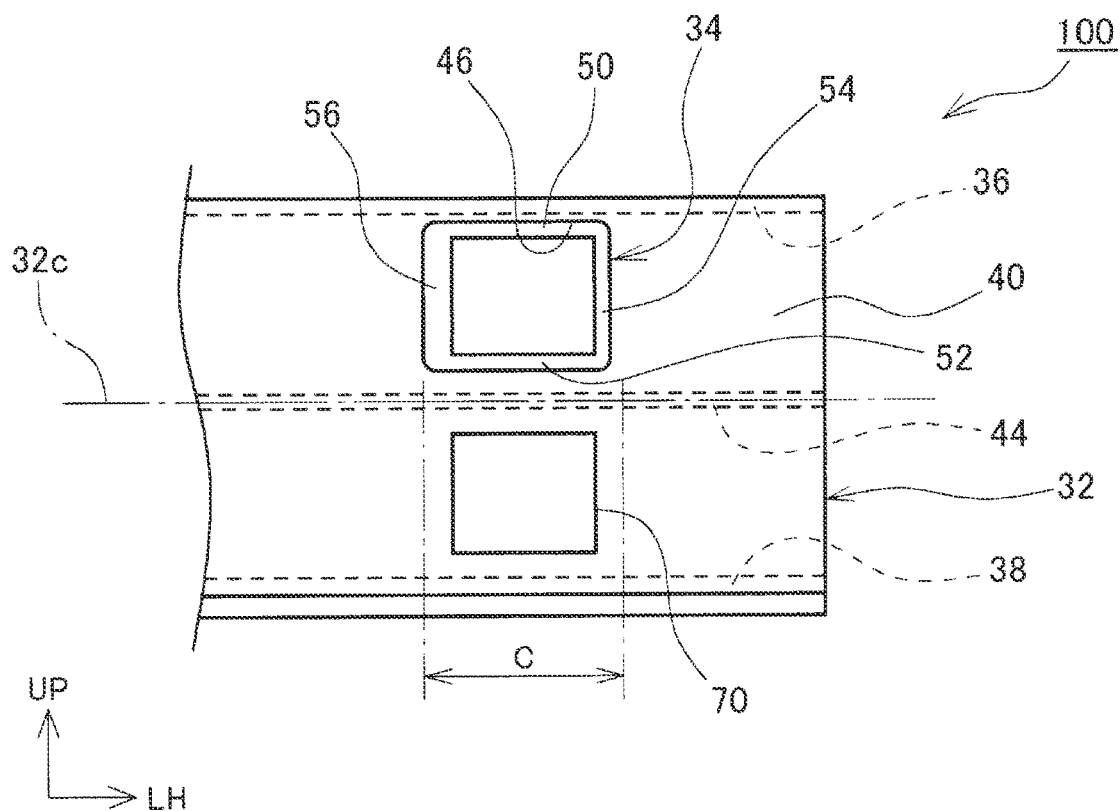
FIG. 4 is an arrow view of the bumper reinforcement and the load transmission member along an arrow IV in FIG. 2.

As illustrated in FIGS. 3, 4, the side end portion 32 of the bumper reinforcement 28 has a hollow square sectional shape and includes an upper wall 36 corresponding to an upper side of the square of the section, a lower wall 38 corresponding to a lower side of the square, a front wall 40 corresponding to a front side of the square in the vehicle front-rear direction, and a rear wall 42 corresponding to a rear side of the square in the vehicle front-rear direction. The square as the sectional shape of the side end portion 32 can be a rectangular shape, for example. In this case, the upper wall 36 and the lower wall 38 may be placed horizontally, and the front wall 40 and the rear wall 42 may be placed vertically. Further, the side end portion 32 includes a reinforcing wall 44 between the upper wall 36 and the lower wall 38. The reinforcing wall 44 is placed so as to connect the front wall 40 to the rear wall 42. The reinforcing wall 44 can be provided over the overall length of the side end portion 32 and also can be placed horizontally. The reinforcing wall 44 is provided so as to achieve necessary strength and rigidity of the side end portion 32. The number of reinforcing walls 44 is not limited to one, and a plurality of reinforcing walls 44 may be provided as necessary. When the side end portion 32 has sufficient strength, the reinforcing wall 44 may not be provided. The front wall 40 and the rear wall 42 have openings 46, 48 configured to receive the load transmission member 34, and the openings 46, 48 are provided at positions between the upper wall 36 and the reinforcing wall 44. The side end portion 32 is made of metal, e.g., aluminum. The central portion 30 of the bumper reinforcement 28 also has the same configuration as the side end portion 32. By use of a material such as aluminum that is suitable for extrusion, the bumper reinforcement 28 can be manufactured by forming the central portion 30 and the side end portion 32 by extrusion.

The load transmission member 34 has an angular tubular shape having a hollow square section. The load transmission member 34 includes an upper wall 50 corresponding to an upper side of the square of the section, a lower wall 52 corresponding to a lower side of the square, an outer wall 54 corresponding to an outer side of the square in the vehicle width direction, and an inner wall 56 corresponding to an inner side of the square in the vehicle width direction. The square as the sectional shape of the load transmission member 34 can be a rectangular shape, for example. In this case, the upper wall 50 and the lower wall 52 may be placed horizontally, and the outer wall 54 and the inner wall 56 may be placed vertically. The walls 50, 52, 54, 56 have the same thickness or may have different thicknesses. More specifically, the thickness of the inner wall 56 can be thicker than those of the other walls, and for example, the thickness of the inner wall 56 can be 1.3 times or more or 1.5 times thicker than those of the other walls. The load transmission member 34 is made of metal, and for example, by use of a material such as aluminum that is suitable for extrusion, the load transmission member 34 can be manufactured by extrusion.

The load transmission member 34 penetrates through the side end portion 32 of the bumper reinforcement 28 such that the load transmission member 34 crosses the side end portion 32 between the upper wall 36 and the reinforcing wall 44 of the side end portion 32. The load transmission member 34 is connected to the front wall 40 and the rear wall 42. Thus, the load transmission member 34 is attached at a position that is offset upward from a center 32c of the side end portion 32 in the up-down direction. The load transmission member 34 penetrates through the side end portion 32 from a front face 32a of the side end portion 32 and further extends rearward in the vehicle front-rear direction and inward in the vehicle width direction such that the load transmission member 34 extends diagonally to the center line of the vehicle.

The load transmission member 34 is joined to the front wall 40 and the rear wall 42 of the side end portion 32 by arc-welding performed along peripheries of the openings 46, 48 formed in the front wall 40 and the rear wall 42. In order to join the load transmission member 34 by arc-welding, a front end portion 34a of the load transmission member 34 projects forward in the vehicle front-rear direction from the front face 32a of the side end portion 32 only by a length d. Fillet welding is performed between an outer periphery of the front end portion 34a thus projecting and the periphery of the opening 46 of the front face 32a of the side end portion 32. In terms of a rear-side part of the load transmission member 34, fillet welding is performed between a part projecting from a rear face 32b of the side end portion 32 and the periphery of the opening 48. Fillet welding may be performed on the whole peripheries of the openings 46, 48 or may be performed on only parts of the peripheries, e.g., only along the upper sides and the lower sides of the openings 46, 48.

The upper wall 50 of the load transmission member 34 and the upper wall 36 of the side end portion 32 of the bumper reinforcement 28 are placed in parallel to each other and adjacent to each other. Instead of this or in addition to this, the lower wall 52 of the load transmission member 34 and the reinforcing wall 44 of the bumper reinforcement 28 are placed in parallel to each other and adjacent to each other.

A rear end of the load transmission member 34 is distanced from the side frame 14. Further, a rear end face 58 of the load transmission member 34 is placed such that a plane defined by the rear end face 58 intersects with the side frame 14. In the load transmission member 34 of the present embodiment, the rear end face 58 is perpendicular to the center line of the load transmission member 34 having the angular tubular shape. An inner margin 60 on the inner side of the rear end face 58 in the vehicle width direction forms a corner facing a side face of the side frame 14. This corner may be chamfered into a round surface.

A square plate 70 formed in a flat-plate shape and having a thickness d that is equal to a projection length d of the front end portion 34a is attached to the front face 32a between the reinforcing wall 44 and the lower wall 38 in each of the right and left side end portions 32R, 32L. The plate 70 constitutes a projecting portion. As illustrated in FIG. 4, the plate 70 is placed right under the load transmission member 34. That is, the plate 70 is placed at a position that is offset downward from the center 32c of the side end portion 32 in the up-down direction reversely to the load transmission member 34. Note that, like a range C illustrated in FIG. 4, the plate 70 may be placed at a position deviating from the load transmission member 34 in the right-left direction instead of a position right under the load transmission member 34, provided that the plate 70 is placed at a position where the plate 70 overlaps the front end portion 34a when the plate 70 is viewed from above in the vehicle up-down direction. Further, the plate 70 may be constituted by a circular plate instead of the square plate.

Figure 5:
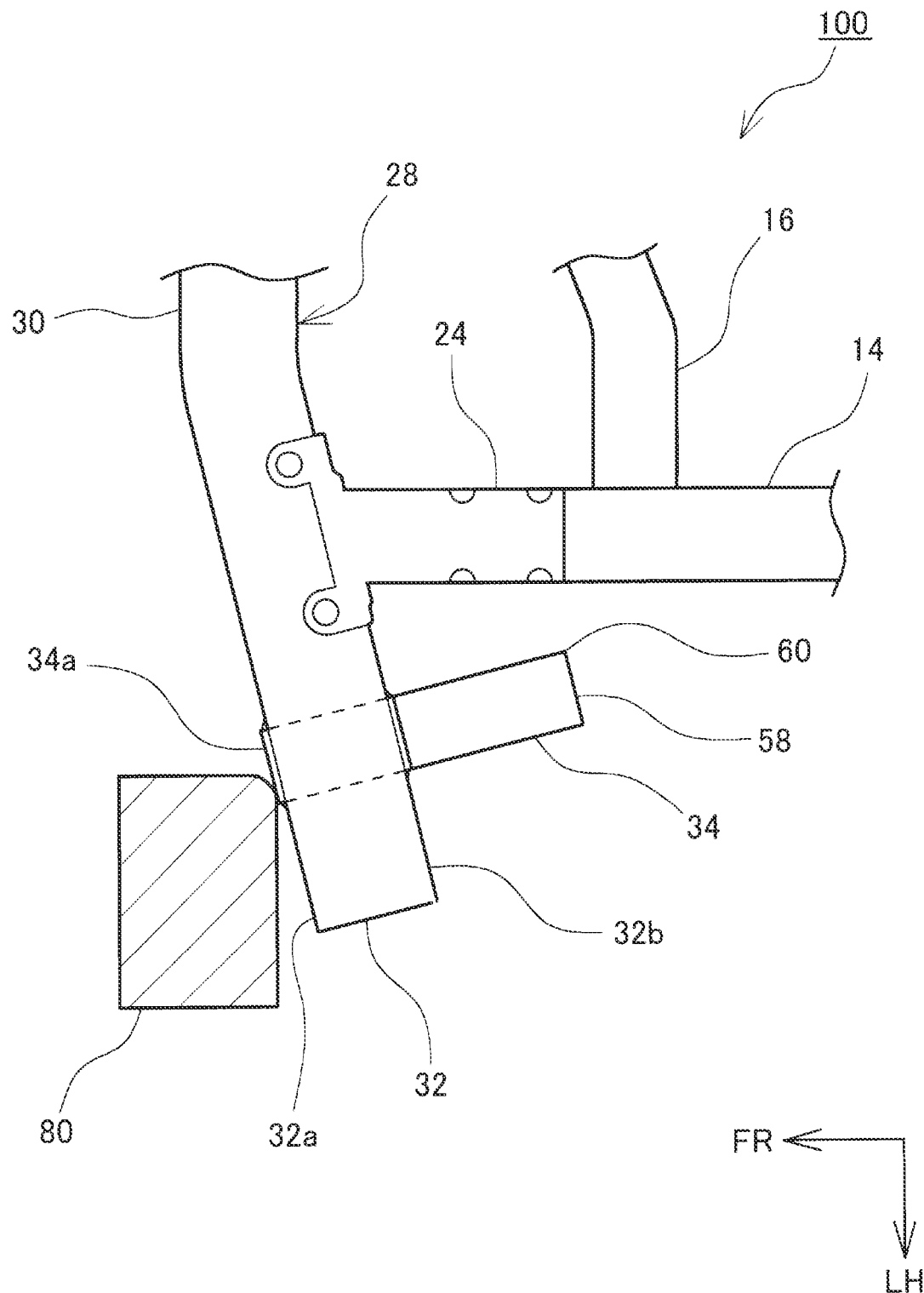
FIG. 5 is a plan view illustrating an initial state of a small overlap collision in the vehicle front structure according to the embodiment.
Figure 6:
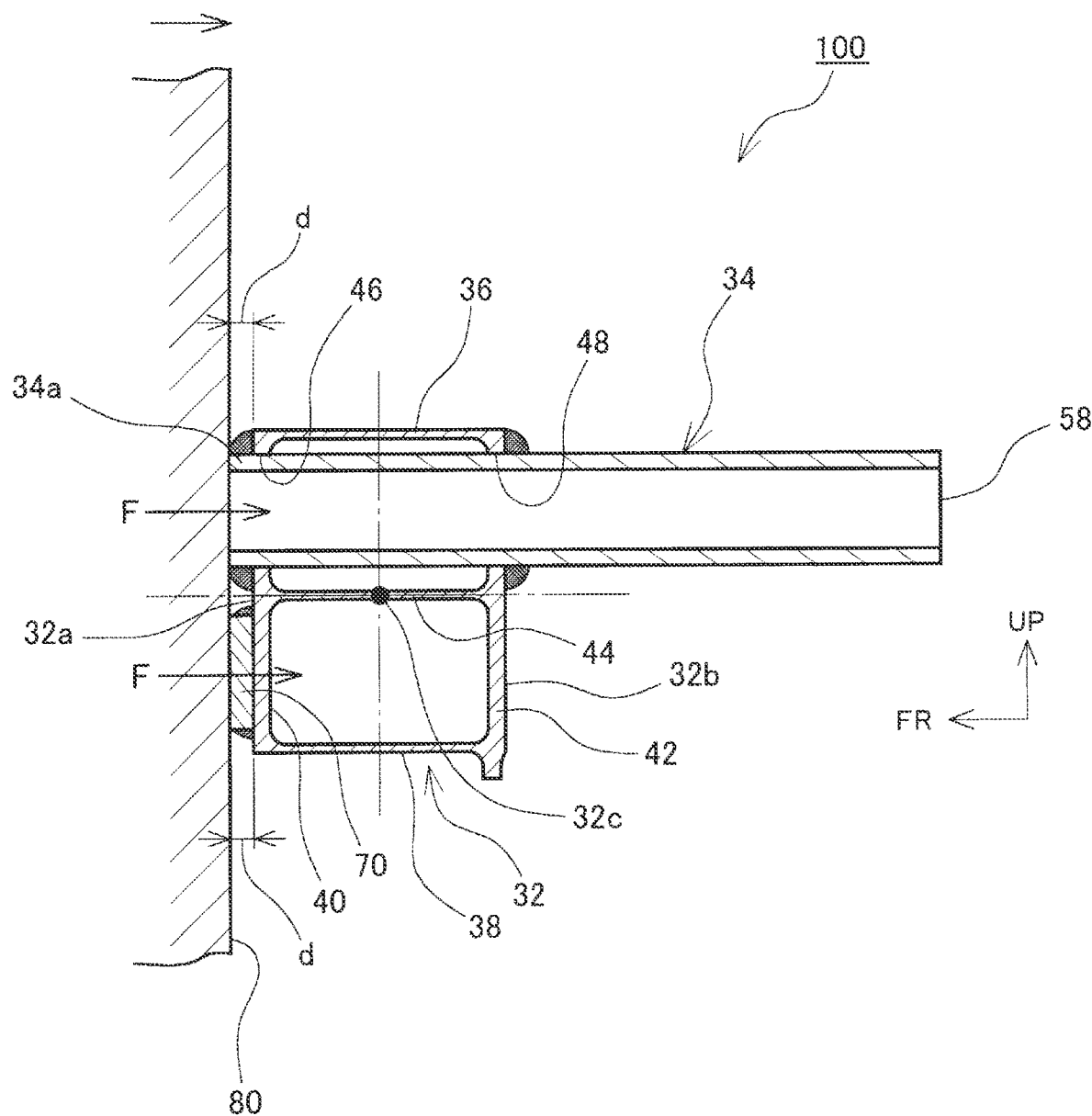
FIG. 6 is a sectional side view illustrating a contact between a barrier and a side end portion of the bumper reinforcement in an initial stage of the small overlap collision in the vehicle front structure according to the embodiment.
Figure 7:
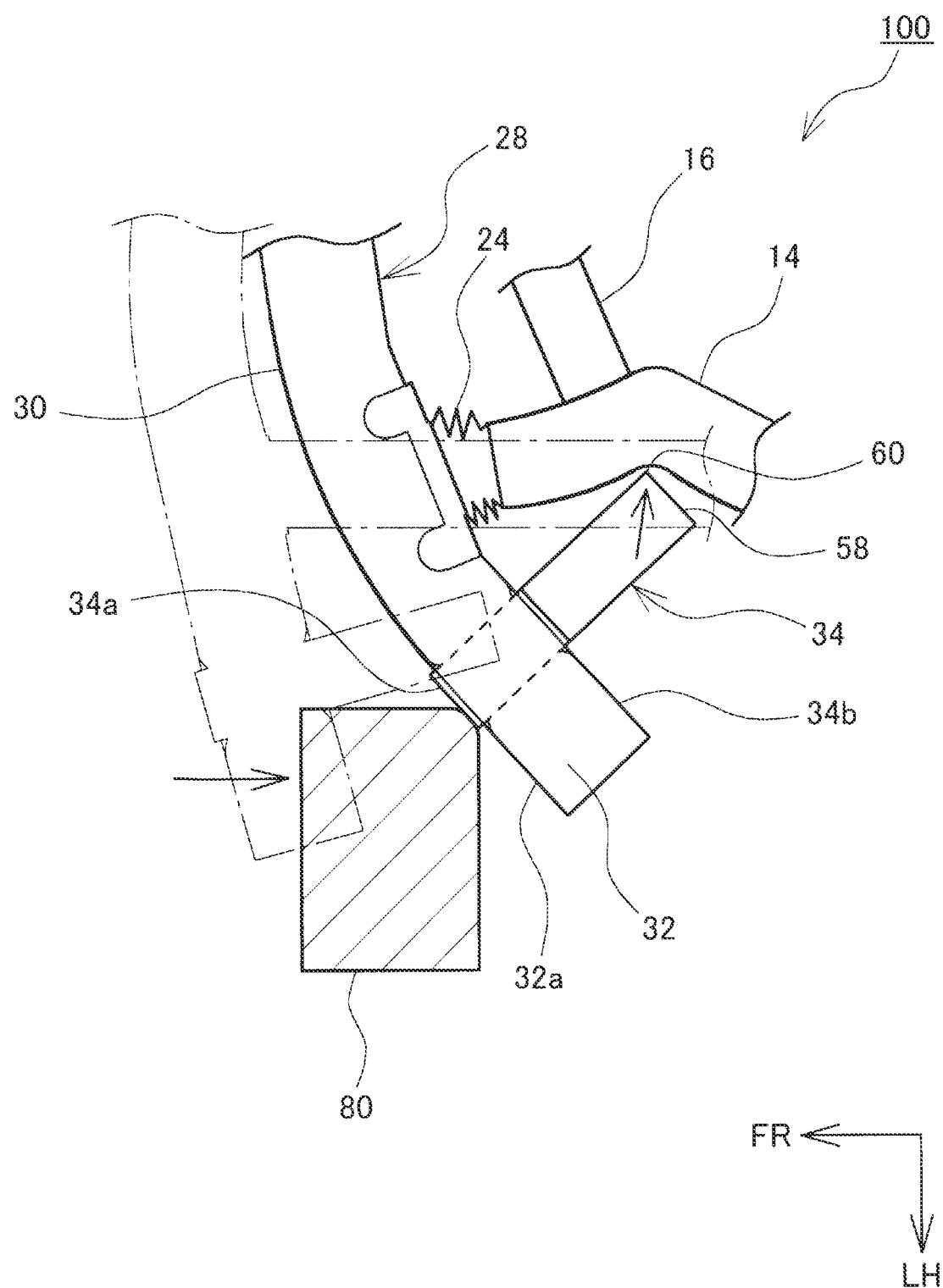
FIG. 7 is a plan view illustrating deformation of the vehicle front structure according to the embodiment in a later stage of the small overlap collision.

With reference to FIGS. 5 to 7, the following describes deformation of the vehicle front structure at the time of a small overlap collision. As illustrated in FIG. 5, the small overlap collision is a collision mode in which an object collides with an outer part of the vehicle front part in the vehicle width direction, the outer part corresponding to one fourth of the vehicle front part. In a collision test, the vehicle collides with a barrier 80. The barrier 80 collides with a part of the vehicle, the part being positioned outward from the side frame 14 in the vehicle width direction. Accordingly, the side frame 14 may not receive a collision load sufficiently. In the vehicle front structure 100, the collision load is transmitted to the side frame 14 via the load transmission member 34 penetrating through the side end portion 32 of the bumper reinforcement 28.

As illustrated in FIGS. 5, 6, in an initial stage of the small overlap collision, the barrier 80 collides with the front end portion 34a of the load transmission member 34 and a front face of the plate 70, the load transmission member 34 and the plate 70 being provided in the side end portion 32. Hereby, due to a collision load indicated by a reference sign F in FIG. 6, the center 32c, in the up-down direction, of the side end portion 32 is moved rearward in the vehicle front-rear direction. Then, as illustrated in FIG. 7, the collision load is transmitted to the crash box 24 of the side frame 14, so that the crash box 24 is crushed. Further, at the same time, the central portion 30 and the side end portion 32 of the bumper reinforcement 28 move rearward and bend, so that the rear end of the load transmission member 34 faces more inward in the vehicle width direction and moves inward in the vehicle width direction. As a result, in a later stage of the small overlap collision, the inner margin 60 of the rear end face 58 of the load transmission member 34 abuts with the side face of the side frame 14, so that the collision load is transmitted to the side frame 14. Hereby, the side frame 14 bends inward in the vehicle width direction, so that collision energy is absorbed. At this time, the load transmission member 34 directly transmits the collision load to the side frame 14, so that the side frame 14 can be bent efficiently. Further, the load transmission member 34 supports the side end portion 32 of the bumper reinforcement 28, thereby making it possible to restrain further entry of the barrier 80.

Figure 8:
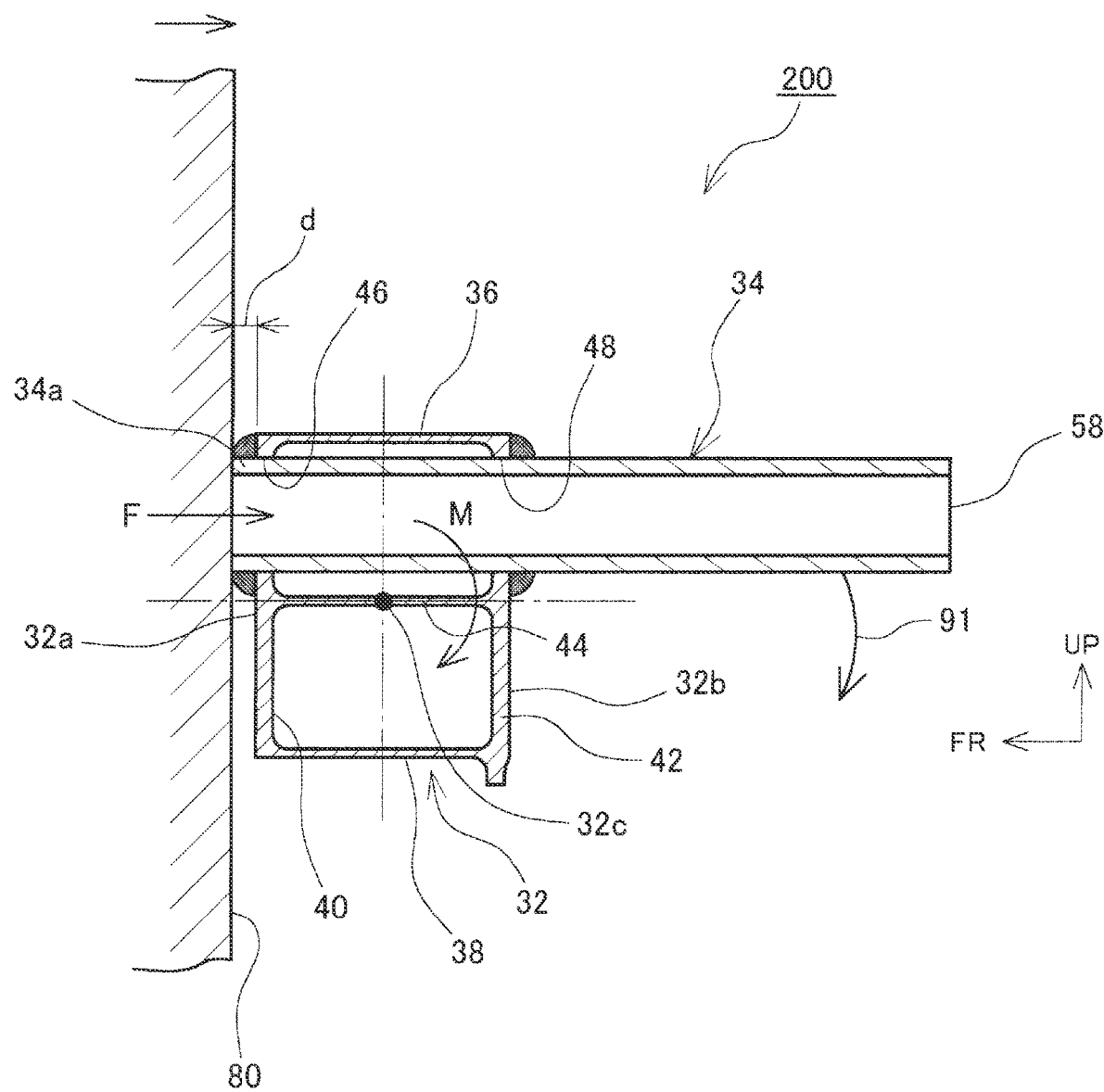
FIG. 8 is a sectional side view illustrating a contact between a barrier and a side end portion of a bumper reinforcement in an initial stage of a small overlap collision in a vehicle front structure according to a comparison example.

In the meantime, like a vehicle front structure 200 as a comparative example illustrated in FIG. 8, in a case where the plate 70 is not attached to the side end portion 32, a collision load from the barrier 80 is input into the front end portion 34a of the load transmission member 34 placed above the center 32c, in the up-down direction, of the side end portion 32. Due to the collision load, a rotational moment M is caused around the center 32c, in the up-down direction, of the side end portion 32, so that the rear end face 58 of the load transmission member 34 rotates downward due to the rotational moment M as indicated by an arrow 91. This causes the height of the rear end face 58 of the load transmission member 34 to be lower than the height of the side frame 14, thereby resulting in that the collision load cannot be sufficiently transmitted to the side frame 14.

In the vehicle front structure 100 of the present embodiment, the plate 70 having the thickness d equal to the projection length d of the front end portion 34a is provided at the position where the plate 70 overlaps the front end portion 34a when the plate 70 is viewed from above in the vehicle up-down direction. The position is on a side opposite, in the up-down direction, from an attachment position of the front end portion 34a of the load transmission member 34. As a result, a collision load is input into the front end portion 34a of the load transmission member 34 and the plate 70 at the same time, thereby making it possible to restrain the side end portion 32 from torsionally deforming due to the collision load and to transmit a desired load to the side frame 14.

The above description deals with a case where the thickness of the plate 70 is equal to the projection length d of the front end portion 34a of the load transmission member 34 from the front face 32a of the side end portion 32. However, the thickness of the plate 70 may not be equal to the projection length d of the front end portion 34a, provided that the thickness of the plate 70 is generally equal to the projection length d of the front end portion 34a. Further, the above description deals with a case where the load transmission member 34 is placed above the center 32c of the side end portion 32 in the up-down direction, and the plate 70 is placed below the center 32c. However, the present disclosure is not limited to this. The load transmission member 34 may be placed below the center 32c, e.g., in a part between the reinforcing wall 44 and the lower wall 38, and the plate 70 may be placed above the center 32c.

Further, instead of attaching the plate 70 to the front face 32a of the side end portion 32, a projection having a height d equal to the projection length d of the front end portion 34a of the load transmission member 34 may be provided on the front face 32a of the side end portion 32. Further, respective load transmission members 34 having the same configuration may be attached between the upper wall 36 and the reinforcing wall 44 in the side end portion 32 and between the reinforcing wall 44 and the lower wall 38, and respective projection lengths of the front end portions 34a of the load transmission members 34 may be set to the same length d.

The above embodiment deals with the vehicle front structure 100 for the vehicle including the ladder frame 12. However, the present disclosure is not limited to this, and this disclosure can be also applied to a vehicle including a monocoque frame. In the case of a monocoque frame, a front side member serves as a side frame member.

What is claimed is:

1. A vehicle front structure comprising:
a pair of right and left side frame members provided in a vehicle front part and extending in a vehicle front-rear direction;
a bumper reinforcement attached to front ends of the right and left side frame members, the bumper reinforcement extending in a vehicle width direction, the bumper reinforcement having right and left side end portions projecting outward in the vehicle width direction from the side frame members, respectively; and
a load transmission member attached to each of the side end portions of the bumper reinforcement at a position offset, in an up-down direction, from a center of the each of the side end portions in the up-down direction, the load transmission member extending rearward in the vehicle front-rear direction and inward in the vehicle width direction, the load transmission member being configured to abut with the each of the side frame members and transmit a collision load to the each of the side frame members at a time of a collision, wherein:
the load transmission member is joined to a front face of the each of the side end portions of the bumper reinforcement such that a front end portion of the load transmission member projects forward in the vehicle front-rear direction from the front face of the each of the side end portions, the load transmission member penetrating through the each of the side end portions and extending rearward in the vehicle front-rear direction and inward in the vehicle width direction; and
the each of the side end portions includes a projecting portion provided at a position offset from the center of the each of the side end portions in the up-down direction to a side opposite, in the up-down direction, from an attachment position of the load transmission member, the position being a position where the projecting portion overlaps the front end portion of the load transmission member when the projecting portion is viewed from above in a vehicle up-down direction, the projecting portion projecting forward in the vehicle front-rear direction from the front face of the each of the side end portions to the same extent as the front end portion of the load transmission member.

2. The vehicle front structure according to claim 1, wherein the projecting portion is constituted by a plate attached to the front face of the each of the side end portions.

* * * * *